United States Patent
Nakamura et al.

(10) Patent No.: US 10,427,381 B2
(45) Date of Patent: Oct. 1, 2019

(54) LAMINATED METAL SHEET FOR CONTAINER

(71) Applicant: JFE STEEL CORPORATION, Tokyo (JP)

(72) Inventors: Norihiko Nakamura, Tokyo (JP); Junichi Kitagawa, Tokyo (JP); Hiroki Nakamaru, Tokyo (JP); Yoichiro Yamanaka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 10 days.

(21) Appl. No.: 15/553,027

(22) PCT Filed: Mar. 31, 2016

(86) PCT No.: PCT/JP2016/060725
§ 371 (c)(1),
(2) Date: Aug. 23, 2017

(87) PCT Pub. No.: WO2016/159260
PCT Pub. Date: Oct. 6, 2016

(65) Prior Publication Data
US 2018/0029334 A1    Feb. 1, 2018

(30) Foreign Application Priority Data

Mar. 31, 2015    (JP) ................. 2015-070504

(51) Int. Cl.
*B32B 15/09* (2006.01)
*B32B 15/18* (2006.01)
(Continued)

(52) U.S. Cl.
CPC ............ *B32B 15/09* (2013.01); *B29C 48/154* (2019.02); *B29C 48/21* (2019.02); *B32B 1/02* (2013.01);
(Continued)

(58) Field of Classification Search
CPC . B32B 15/09; B32B 15/18; B32B 2307/4026; B32B 2367/00; B32B 37/00;
(Continued)

(56) References Cited

U.S. PATENT DOCUMENTS 6,025,056 A * 2/2000 Machii .................... B32B 15/08
428/204
2003/0069387 A1 4/2003 Majima et al.
(Continued)

FOREIGN PATENT DOCUMENTS

CN            1395599 A    2/2003
CN          101939163 A    1/2011
(Continued)

OTHER PUBLICATIONS

Jun. 14, 2016 Search Report issued in International Patent Application No. PCT/JP2016/060725.
(Continued)

*Primary Examiner* — Prashant J Khatri
*Assistant Examiner* — Daniel P Dillon
(74) *Attorney, Agent, or Firm* — Oliff PLC

(57) ABSTRACT

A laminated metal sheet 1 includes a film 3 including a laminated resin layer including at least two layers with polyester as a main component formed on one face or both faces of a metal sheet 2. A polyester resin layer serving as a lower layer 3a in contact with the metal sheet 2 of the laminated resin layer contains 90 mol % or more of terephthalic acid as a polycarboxylic acid component and contains a polyol component containing ethylene glycol and 1,4-butanediol, in which the polyol component contains 30 to 50 mol % of ethylene glycol, 50 to 70 mol % of 1,4-butanediol, and 10 mol % or less of other polyol components. A polyester resin layer serving as an upper layer 3b of the laminated resin layer contains polyester
(Continued)

containing terephthalic acid as a polycarboxylic acid component and 1,4-butanediol as a polyol component both of which are 90 mol % or more of the respective components, has a total thickness of 3 to 25 μm, and has a ratio (I011/I100) of peak intensity (I011) observed in the range of 2θ=15.5 degrees to 17.0 degrees to peak intensity (I100) observed in the range of 2θ=22.5 degrees to 24.0 degrees in X-ray diffraction in the range of 0.2 to 5.0.

8 Claims, 1 Drawing Sheet

(51) Int. Cl.
| | | |
|---|---|---|
| B65D 1/12 | (2006.01) | |
| B65D 25/14 | (2006.01) | |
| B65D 25/34 | (2006.01) | |
| B32B 27/36 | (2006.01) | |
| B65D 65/40 | (2006.01) | |
| B32B 7/00 | (2019.01) | |
| B32B 7/02 | (2019.01) | |
| B32B 15/08 | (2006.01) | |
| B32B 15/20 | (2006.01) | |
| B32B 1/02 | (2006.01) | |
| B65D 25/36 | (2006.01) | |
| B65D 1/09 | (2006.01) | |
| B65D 1/28 | (2006.01) | |
| B29C 48/154 | (2019.01) | |
| B29C 48/21 | (2019.01) | |
| C21D 9/46 | (2006.01) | |
| B29C 48/30 | (2019.01) | |
| B29C 48/305 | (2019.01) | |

(52) U.S. Cl.
CPC ............... *B32B 7/00* (2013.01); *B32B 7/02* (2013.01); *B32B 15/08* (2013.01); *B32B 15/18* (2013.01); *B32B 15/20* (2013.01); *B32B 27/36* (2013.01); *B65D 1/09* (2013.01); *B65D 1/12* (2013.01); *B65D 1/28* (2013.01); *B65D 25/14* (2013.01); *B65D 25/34* (2013.01); *B65D 25/36* (2013.01); *B65D 65/40* (2013.01); *B29C 48/30* (2019.02); *B29C 48/305* (2019.02); *B32B 2250/03* (2013.01); *B32B 2250/04* (2013.01); *B32B 2250/05* (2013.01); *B32B 2255/06* (2013.01); *B32B 2255/26* (2013.01); *B32B 2255/28* (2013.01); *B32B 2270/00* (2013.01); *B32B 2307/30* (2013.01); *B32B 2307/40* (2013.01); *B32B 2307/412* (2013.01); *B32B 2307/702* (2013.01); *B32B 2439/00* (2013.01); *B32B 2439/66* (2013.01); *B32B 2439/70* (2013.01); *C21D 9/46* (2013.01)

(58) Field of Classification Search
CPC ... C08L 67/02; Y10T 428/2848; C23C 28/00; B29C 48/00
See application file for complete search history.

(56) References Cited

U.S. PATENT DOCUMENTS

| | | |
|---|---|---|
| 2006/0228524 A1 | 10/2006 | Kubo et al. |
| 2010/0310824 A1 | 12/2010 | Oshima et al. |
| 2011/0220645 A1* | 9/2011 | Niederst ................ B32B 15/08 220/200 |
| 2014/0162055 A1 | 6/2014 | Kitagawa et al. |
| 2014/0339123 A1 | 11/2014 | Nakagawa et al. |
| 2015/0064378 A1 | 3/2015 | Kawakusu |
| 2016/0257099 A1* | 9/2016 | Yamanaka ............. B65D 25/14 |

FOREIGN PATENT DOCUMENTS

| | | |
|---|---|---|
| CN | 104023974 A | 9/2014 |
| EP | 1627820 A1 | 2/2006 |
| EP | 2752291 A1 | 7/2014 |
| EP | 2832763 A1 | 2/2015 |
| JP | H05-269819 A | 10/1993 |
| JP | 2565284 B2 | 12/1996 |
| JP | 3083707 B2 | 9/2000 |
| JP | 2001-1447 A | 1/2001 |
| JP | 2002-307632 A | 10/2002 |
| JP | 2002-331612 A | 11/2002 |
| JP | 2002-331629 A | 11/2002 |
| JP | 2003-213104 A | 7/2003 |
| JP | 3481196 B2 | 12/2003 |
| JP | 2004-74777 A | 3/2004 |
| JP | 2005-254629 A | 9/2005 |
| JP | 3697854 B2 | 9/2005 |
| JP | 3753592 B2 | 3/2006 |
| JP | 4681875 B2 | 5/2011 |
| JP | 2014-210363 A | 11/2014 |
| WO | 2007/058152 A1 | 5/2007 |
| WO | WO-2015064100 A1 * | 5/2015 ............. B65D 25/14 |

OTHER PUBLICATIONS

Nov. 6, 2018 extended European Search Report issued in European Application No. 16773140.5.
Dec. 27, 2018 Office Action issued in Chinese Patent Application No. 201680018526.X.

* cited by examiner

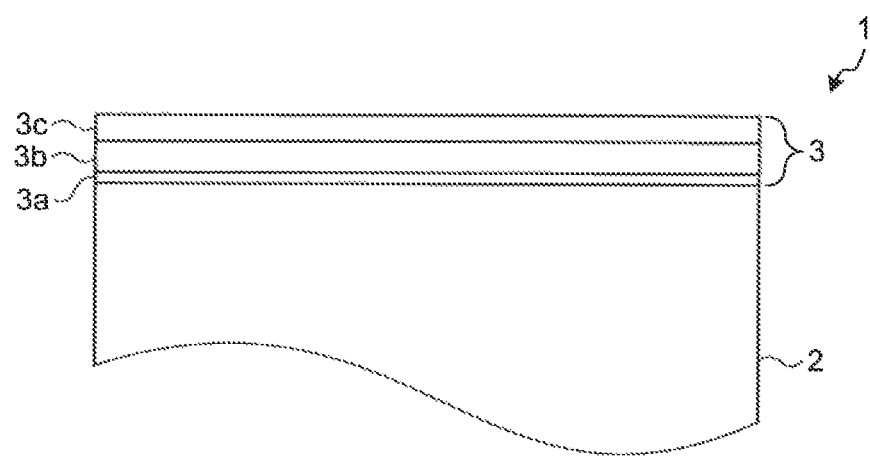

LAMINATED METAL SHEET FOR CONTAINER

FIELD

The present invention relates to a laminated metal sheet for a container for use in a material of containers such as beverage cans and food cans.

BACKGROUND

Solvent-based coatings with a thermoset resin as a main component have been conventionally applied to the inner face and the outer face of metal cans for food for the purpose of preventing the corrosion of metal can materials while maintaining the taste of contents or for the purpose of improving the appearance of the outer face of cans, protecting printed faces, and the like. However, the solvent-based coatings are required to be heated at high temperatures in order to form coated films, which vaporizes a large amount of solvents during the process, leading to problems in terms of operational safety and environment. Given these circumstances, the coating of metal with a thermoplastic resin has been recently developed as a solvent-free method of corrosion prevention. In this technique, polyester in particular is excellent in formability, heat resistance, and the like among thermoplastic resins, and polyester-based films to be laminated on metal are being developed.

However, metal containers laminated with polyester films have a problem in that their appearance and the taste of contents are impaired during high-temperature sterilization treatment such as retort sterilization treatment. There is another problem in that whitening (retort whitening) occurs, in which the resin layer itself discolors to be turbid in white during the retort sterilization treatment.

To address the above circumstances, many techniques are disclosed as a method for maintaining the taste of contents. Patent Literature 1 to Patent Literature 6 disclose a resin coating technique with a butylene terephthalate unit as a main body, for example.

In particular, a decorative film for a steel sheet disclosed in Patent Literature 4 includes an adhesive layer with a noncrystalline copolymerized polyethylene terephthalate-based resin as a main component on its face to be laminated on a steel sheet. In this adhesive layer, part of ethylene glycol as a diol moiety of polyethylene terephthalate is replaced with 1,4-cyclohexane dimethanol. A layer with a pigment-added polybutylene terephthalate as main component is provided on the adhesive layer. This adhesive layer has a thickness of 2 to 50 μm that is less than 50% of the thickness of all the layers.

Patent Literature 5 discloses a laminated, polyester film including at least two layers, the film mainly for a wallpaper surface layer. One layer of polyester out of the layers is a film excellent in gas barrier properties containing 90 mol % or more of an ethylene glycol component and an 1,4-butanediol component as glycol components.

A resin-coated steel sheet for a container disclosed in Patent Literature 6, which is a steel sheet for a 18-liter can, is coated with a resin layer obtained by blending polybutylene terephthalate and polyethylene terephthalate together so that the resin layer is in contact with the steel sheet. A layer formed of polybutylene terephthalate is laminated thereon to form two layers, and a layer formed of a copolymerized polyester resin containing polyethylene terephthalate and isophthalate is laminated further thereon. Out of the former two layers, the layer applied so as to be in contact with the steel sheet is an unoriented layer in which the blending ratio of polybutylene terephthalate is 1/5 or higher relative to polyethylene terephthalate, and the layer formed of polybutylene terephthalate laminated thereon is an unoriented layer.

Patent Literature 7 and Patent Literature 8 disclose films formed of polybutylene terephthalate and polyethylene terephthalate.

CITATION LIST

Patent Literature

Patent Literature 1: Japanese Patent No. 3697854
Patent Literature 2: Japanese Patent No. 2565284
Patent Literature 3: Japanese Patent No. 3083707
Patent Literature 4: Japanese Patent No. 4681875
Patent Literature 5: WO 2007/058152
Patent Literature 6: Japanese Patent Application Laid-open No. 2001-1447
Patent Literature 7: Japanese Patent No. 3481196
Patent Literature 8: Japanese Patent No. 3753592

SUMMARY

Technical Problem

However, Patent Literature 1 to Patent Literature 3 do not consider uses on which the retort sterilization treatment is performed and formability. In other words, Patent Literature 1 to Patent Literature 3 are low in the ratio of polybutylene terephthalate and may whiten when the retort sterilization treatment is performed. Although Patent Literature 2 is limited to can-forming with a sheet thickness reduction rate of 20%, the invention of the present application requires high forming with a sheet thickness reduction rate of 50%. Patent Literature 2 has oriented crystals and may be poor in formability when subjected to high can-forming. The techniques in Patent Literature 4 and Patent Literature 5 are used for the exterior and are not required to perform retort sterilization, which does not solve the problem of retort whitening.

The technique of Patent Literature 6, which is targeted for a 18-liter can, does not perform retort sterilization and does not solve the problem of retort whitening. When being used for a top lid in particular, the film may be damaged when a handle is mounted by welding, and a film thickness of 40 μm or larger is required; when a similar thick film is used for the use of the present invention, forming becomes difficult, and the thick film cannot be used for the use of the invention of the present application. In addition, it is considered that being a thick film is advantageous to retort whitening, which is not regarded as problematic. The films of Patent Literature 7 and Patent Literature 8 have no adhesive layer and have the problem of adhesion when being processed. The present invention has been made in view of the foregoing, and an object thereof is to provide a laminated metal sheet for a container that is excellent in both formability and the design of can body appearance after the retort sterilization treatment and can be used for two-piece cans such, as drawn and redrawn (DRD) cans and drawn and ironed (DI) cans.

Solution to Problem

A laminated metal sheet for a container according to the present invention is a laminated metal sheet for a container including a laminated resin layer including at least two layers with polyester formed by polymerizing a polycarboxylic acid component and a polyol component as a main component on one face or both faces of a metal sheet, a polyester resin layer serving as a lower layer in contact with the metal sheet of the laminated resin layer contains 90 mol % or more of terephthalic acid in the polycarboxylic acid component and 30 to 50 mol % of ethylene glycol, 50 to 70 mol % of 1,4-butanediol, and 10 mol % or less of other polyol components in the polyol component, and a polyester resin layer serving as a main layer and an upper layer of the laminated resin layer includes polyester containing 90 mol % or more of terephthalic acid in the polycarboxylic acid component and 90 mol % or more of 1,4-butanediol in the polyol component, has a total thickness of 3 to 25 μm, and has a ratio ($I_{011}/I_{100}$) of peak intensity ($I_{011}$) observed in a range of 2θ=15.5 degrees to 17.0 degrees to peak intensity ($I_{100}$) observed in a range of 2θ=22.5 degrees to 24.0 degrees in X-ray diffraction in a range of 0.2 to 5.0.

In the above-described laminated metal sheet for a container according to the present invention, the lower layer in contact with the metal sheet in the laminated resin film has a film thickness ratio of 10 to 30% relative to a total thickness of the laminated resin layer of resin.

In the above-described laminated metal sheet for a container according to the present invention, the laminated resin layer contains a coloring pigment.

The above-described laminated metal sheet for a container according to the present invention includes a polyester resin of 1 μm or thicker laminated further above the laminated resin layer, wherein the entire resin layer has a total film thickness of 3 to 25 μm.

Advantageous Effects of Invention

The present invention can provide a laminated metal sheet for a container that is excellent in both formability and the design of can body appearance after the retort sterilization treatment and can be used for two-piece cans such as DRD cans and DI cans.

BRIEF DESCRIPTION OF DRAWING

FIG. 1 is a schematic diagram of a section on one side of a laminated metal sheet as one embodiment of the present invention.

DESCRIPTION OF EMBODIMENTS

The following describes an embodiment of the present invention in detail. This embodiment does not limit the present invention.

As a result of dedicated examination to solve the problems, the inventors of the present invention have found out that the problems can be solved by using a metal sheet laminated with a polyester film having a specific composition without being oriented to remain unoriented to achieve the present invention.

When retort sterilization treatment is performed on canned food manufactured using metal sheets coated with a general polyester resin, a phenomenon in which a resin layer on the outer face side of cans of the canned food whitens is observed in many cases. This phenomenon means that minute voids are formed within the resin layer and diffusely reflect external light, which is observed to be turbid in white. These voids are not formed by heat treatment in a dried condition. Furthermore, these voids are not formed during the retort sterilization treatment on empty cans, which are not filled with contents. When a section of a resin layer and a metal sheet in which whitening occurs is observed, whitening does not occur in the entire thickness of the resin layer and is observed in a resin near the surface of the metal sheet (that is, near the lowermost layer of the resin layer). From this observation result, it is considered that the voids are formed in the resin layer on the outer face side of cans of canned food during the retort sterilization treatment by the following mechanism.

The outer face side of a can body filled with contents is exposed to high-temperature, high-pressure vapor immediately after the start of the retort sterilization treatment. In this process, part of the vapor passes through the resin layer on the outer face side of the can body to enter near the surface of the metal sheet. The can body filled with the contents is cooled by the contents with which it was filled before the retort sterilization treatment, and the resin near the surface of the metal sheet in particular in the resin layer on the outer face side of the can body is lower in temperature than the atmosphere around the can body. Consequently, the high-temperature vapor that has entered the polyester resin near the surface of the metal sheet is cooled to be condensed to water. This condensed water spreads out the resin layer on the outer face side to form water bubbles. When the retort sterilization treatment proceeds, the temperature of the contents increases, and these water bubbles immediately vaporize. It is estimated that these vaporizing water bubbles leave voids.

When a polyester resin layer is formed by a lamination method that heat-seals a polyester film onto a heated metal sheet, the polyester resin near the surface of the metal sheet in particular is likely affected by heat, and even in the case of a conventional biaxially oriented polyester film, the polyester resin near the surface of the metal sheet may be noncrystalline, in which crystalline orientation has broken down, and may degrade in mechanical strength. In the case of an unoriented polyester film, the polyester resin layer has a noncrystalline structure, in which the crystals of the polyester resin are not oriented, during film formation and is originally not high in mechanical strength. It is considered that in both cases the polyester resin layer near the surface of the metal sheet is low in mechanical strength and is prone to become deformed, and voids are formed as described above. In other words, whitening can occur regardless of the method of film formation regardless of being the biaxially oriented polyester film or the unoriented polyester film.

It is considered that the lessening of whitening (improvement in resistance to retort whitening) can be achieved if the strength of the resin near the surface of the metal sheet in the polyester resin layer to be the outer face side when being formed into a container can be increased by crystallization or the like. However, heat sealing, which is a general method of manufacture, heats a metal sheet to a high temperature equal to or higher than the glass transition point of a polyester film to heat-seal the polyester film and forms a polyester resin layer, and even when the polyester film has a crystalline structure in advance, the crystal structure of the polyester resin near the surface of the metal sheet inevitably breaks down. Consequently, the inventors of the present invention have thought that the polyester resin layer is formed as a noncrystalline layer that is low in mechanical strength immediately after lamination and is formed as a hard, strong layer after being formed into a can body (a can barrel and a lid) as a container, thereby avoiding whitening.

Examples of a method for crystallizing the resin near the surface of the metal sheet in the polyester resin layer to be the outer face side when being formed into the container before the retort sterilization treatment include performing heat treatment before the retort sterilization treatment. When the heat treatment is performed before container formation, the polyester resin having high crystalline orientation is poor in formability and is extremely limited in terms of the applicable form of containers, which is unrealistic. When the heat treatment is performed after container formation, the number of processes after formation increases, and there is a disadvantage in that manufacturing costs increase.

Given these circumstances, aiming at increasing crystallization using heat during the retort sterilization treatment, the inventors of the present invention have thought of finding a resin composition having a high crystallization rate to use it for a laminated metal sheet for a container. In other words, the inventors of the present invention have thought of crystallizing a noncrystalline polyester resin before voids are formed in the resin layer on the outer face side of cans by the retort sterilization treatment to improve the strength of the resin layer.

For this purpose, the laminated metal sheet as the embodiment of the present invention is configured as described below. FIG. 1 is a schematic diagram of a section on one side of the laminated metal sheet as the embodiment of the present invention. As illustrated in FIG. 1, this laminated metal sheet 1 of the present embodiment includes a metal sheet 2 and a film 3 formed on one face or both faces of the metal sheet 2. The film 3 is formed on at least a face that, when the laminated metal sheet 1 is formed into a container, will be an outer face side of the container and includes a polyester resin layer (a laminated resin layer) including at least two laminated layers, or a lower layer 3a in contact with the metal sheet 2 and an upper layer 3b on the surface side. These polyester resin layers 3a and 3b may contain a coloring pigment. However, in view of adhesion with the metal sheet, the lower layer 3a in contact with the metal sheet 2 does not preferably contain any coloring pigment. A polyester resin layer that does not contain any coloring pigment is preferably formed as an upper layer (3c) further above the upper layer 3b of this laminated resin layer. Each of the polyester resin layers 3a, 3b, and 3c may include a plurality of layers.

<Metal Sheet>

Steel sheets or aluminum sheets, widely used as materials for cans, can be used for the metal sheet 2 as a substrate in the present invention; particularly preferred is tin-free steel (hereinafter, TFS), which is a surface-treated steel sheet having a two-layer coating with metallic chromium as its lower layer and with a chromium hydroxide as its upper layer. The deposition amounts of the metallic chromium layer and the chromium hydroxide layer of the TFS are not limited to a particular amount; in view of formability and corrosion resistance, the metallic chromium layer is desirably in the range of 70 to 200 mg/m$^2$, whereas the chromium hydroxide layer is desirably in the range of 10 to 30 mg/m$^2$.

<Film Laminated on Metal Sheet>

The film 3 laminated on the metal sheet 2 in the present invention includes a laminated resin layer including at least two layers with polyester as a main component and is formed without being biaxially oriented to remain unoriented. Biaxially oriented films examined in the past have oriented crystals in which resin molecular chains are oriented in a specific orientation by an orientation process and impair ductility, although film strength increases. The oriented crystals remaining in a large amount causes a hindrance to formability. A biaxially oriented film-laminated metal sheet thus markedly changes in performance by heat input during lamination, which is required be controlled with closest attention paid. In forming with a large degree of can-forming such as DI cans in particular, the lamination is performed at a high temperature near the melting point of the resin to make the oriented crystals almost amorphous (noncrystalline), thereby improving formability. In that case, the film flows because of high temperature and adheres to a pressure roll during the lamination on the metal sheet, which can cause a reduction in productivity. An unoriented film, which does not require any careful control of a lamination condition, is excellent in lamination processability.

<Polyester Resin Layer as Under Layer in Contact with Metal Sheet>

The polyester resin layer in contact with the metal sheet 2 formed in the lower layer 3a of the laminated resin layer contains polyester with terephthalic acid as a main component as a polycarboxylic acid component and with ethylene glycol and 1,4-butanediol as main components as polyol components in order to lessen whitening after the retort sterilization treatment. In the polycarboxylic acid component, terephthalic acid is 90 mol % or more and preferably 95 mol % or more. If terephthalic acid is less than 90 mol %, resistance to retort whitening is impaired. Ethylene glycol in the polyol components is 30 to 50 mol %, 1,4-butanediol is 50 to 70 mol %, and other polyol components are 10 mol % or less. If ethylene glycol is less than 30 mol %, adhesion after can-forming is impaired; if ethylene glycol exceeds 50 mol %, resistance to retort whitening is impaired. To the extent that the effects of the present invention are not hindered, 10 mol % or less of other monomers may be copolymerized.

Examples of the polycarboxylic acid component to be copolymerized include dicarboxylic acids such as isophthalic acid, phthalic acid, 2,6-naphthalene dicarboxylic acid, sodium 5-sulfoisophthalic acid, oxalic acid, succinic acid, adipic acid, sebacic acid, azelaic acid, dodecanoic diacid, dimer acid, maleic anhydride, maleic acid, fumaric acid, itaconic acid, citraconic acid, mesaconic acid, and cyclohexane dicarboxylic acid, 4-hydroxybenzoic acid, ε-caprolactone, and lactic acid. Examples of the polyol component to be copolymerized include diethylene glycol, 1,3-propanediol, neopentyl glycol, 1,6-hexanediol, cyclohexane dimethanol, triethylene glycol, polyethylene glycol, polypropylene glycol, polytetramethylene glycol, and ethylene oxide adducts of bisphenol A and bisphenol S. Furthermore, as copolymerization components, a small amount of trifunctional compounds such as trimellitic acid, trimesic acid, pyromellitic acid, trimethylol propane, glycerol, and pentaerythritol may be added. Two or more of these copolymerization compounds may be added in combination.

<Polyester Resin Layer as Upper Layer of Polyester Resin Layer as Under Layer in Contact with Metal Sheet>

The polyester resin layer (hereinafter, referred to as a main layer) on the surface side positioned in the upper layer 3b of the polyester resin layer as the lower layer 3a in contact with the metal sheet 2 contains polyester with terephthalic acid as a main component as a polycarboxylic acid component and with 1,4-butanediol as a main component as a polyol component. As the polycarboxylic acid component, terephthalic acid copolymerized with 10 mol % or less of a polycarboxylic acid other than terephthalic acid may be the main component. As the polycarboxylic acid component, terephthalic acid copolymerized with 10 mol % or less of isophthalic acid is the main component, for example.

The main component referred to in the present specification indicates being 90 mol % or more and preferably 95 mol % or more in the respective components. If the main component is less than 90 mol %, resistance to discoloration degrades. As the extent that the effects of the present invention are not hindered, 10 mol % or less of other monomers may be copolymerized. Examples of the polycarboxylic acid component to be copolymerized include dicarboxylic acids such as isophthalic acid, phthalic acid, 2,6-naphthalene dicarboxylic acid, sodium 5-sulfoisophthalic acid, oxalic acid, succinic acid, adipic acid, sebacic acid, azelaic acid, dodecanoic diacid, dimer acid, maleic anhydride, maleic acid, fumaric acid, itaconic acid, citraconic acid, mesaconic acid, and cyclohexane dicarboxylic acid, 4-hydroxybenzoic acid, ε-caprolactone, and lactic acid.

Examples of the polyol component to be copolymerized include ethylene glycol, diethylene glycol, 1,3-propanediol, neopentyl glycol, 1,6-hexanediol, cyclohexane dimethanol, triethylene glycol, polyethylene glycol, polypropylene glycol, polytetramethylene glycol, and ethylene oxide adducts of bisphenol A and bisphenol S. Furthermore, as copolymerization components, a small amount of trifunctional compounds such as trimellitic acid, trimesic acid, pyromellitic acid, trimethylol propane, glycerol, and pentaerythritol may be added. Two or more of these copolymerization compounds may be added in combination.

These polyester resin layers 3a and 3b may contain a coloring pigment. However, in view of adhesion with the metal sheet 2, the lower layer 3a in contact with the metal sheet 2 does not preferably contain any coloring pigment. The coloring pigment is added to the polyester resin layer to form a colored resin layer, whereby a brilliant color using the metallic luster of the substrate can be added, and excellent appearance can be obtained. Unlike printing on the surface of the film 3, the pigment is directly added to the film 3 to be colored, whereby a color tone does not degrade even in a container forming process, and favorable appearance can be maintained. Coating printing is generally performed after container formation; by forming the colored resin layer, part of the process can be omitted.

The coloring pigment to be added is required to exhibit excellent appearance after container formation; preferred are inorganic pigments such as titanium dioxide and disazo-based organic pigments. These pigments are strong in coloring power and rich in expandability, and excellent appearance can be ensured even after container formation, which is favorable. The pigment to be added to the polyester resin layer to be the inner face side of containers in particular is desirably titanium dioxide. This is because the color of contents looks fine and a feeling of cleanliness can be given after opening containers. The pigment to be added to the polyester resin layer to be the outer face side of containers is desirably a disazo-based pigment. This is because the disazo-based pigment is excellent in transparency, is strong in coloring power, and rich in expandability, and appearance with a brilliant color can be obtained even after can formation.

The amount to be added of the coloring pigment may be selected as appropriate in accordance with a required degree of coloring. The amount to be added of titanium dioxide as a white pigment is desirably 5 to 30% in terms of mass redo relative to the polyester resin layer. If the amount of titanium dioxide is less than 5%, the degree of whiteness is insufficient, and favorable appearance cannot be ensured. In contrast, the content exceeding 30% saturates the degree of whiteness and is economically disadvantageous, and the content is desirably less than 30%. In the section below, the amount to be added of the pigment means the ratio thereof to the polyester resin layer to which the pigment has been added (to the polyester resin layer as the lower layer 3a when it has been added to the polyester resin layer as the lower layer 3a).

The amount to be added of the disazo-based pigment may be selected as appropriate in accordance with a required degree of yellow. Organic pigments can generally ensure a desired color with a smaller amount than inorganic pigments; in the case of the disazo-based pigment, the amount to be added is desirably 0.3 to 0.6% in terms of mass ratio relative to the polyester resin layer. A yellow pigment is preferably at least one of those the Color Index (C.I. registered name) of which are Pigment Yellow 12, 13, 14, 16, 17, 55, 81, 83, 180, and 181. In view of the sharpness of the color tone (the brilliant color), resistance to bleeding (the ability to lessen a phenomenon in which the pigment precipitates on the surface of the film) in a retort sterilization treatment environment, and the like in particular, pigments having a high molecular weight and poor solubility to polybutylene terephthalate are desirable; more preferably used is C.I. Pigment Yellow 180 having a molecular weight of 700 or higher and a benzimidazolone structure.

<Polyester Resin Layer Forming Outermost Layer>

To lessen a color tone change after retorting when the pigment is added to the main layer 3b, an outermost layer 3c may be formed as a further upper layer of the two-layer laminated resin layer (that is, a further upper layer of the main layer 3b). The thickness of the polyester resin layer as the outermost layer 3c is preferably 1 µm or larger in order to stably ensure the lessening of the color tone change. As to the film thickness upper limit, a film thickness such that the entire resin layer will not exceed a film thickness upper limit may be ensured. The resin composition, which is not limited to a particular composition, preferably has a melting point difference from that of the lower layer 3a in contact with the metal sheet 2 or the main layer 3b as the upper layer thereof of 20° C. or less in view of film formation and further preferably has a resin composition similar to that of the lower layer 3a or the main layer 3b.

<Film Thickness Ratio Between Upper Layer and Lower Layer of Laminated Resin Layer>

The present invention has the film thickness upper limit in view of formability, and to ensure resistance to retort whitening, formability, adhesion, and adhesion after can formation within the limited film thickness, the film thickness ratio between the upper layer (the main layer) 3b and the lower layer 3a of the laminated resin layer is preferably set to a specific range; the film thickness of the lower layer 3a in contact with the metal sheet 2 is preferably 5% or more and 50% or less and more preferably 10% or more and 30% or less of the total thickness of the upper layer 3b and the lower layer 3a. If the film thickness ratio is less than 10%, adhesion after can formation may be poor. If the film thickness ratio exceeds 30%, although there is no degradation in performance, productivity may be poor, which undesirably leads to a cost increase.

<Film Thickness>

The thicknesses of the entire films 3 for the inner face side and the outer face side are 3 to 25 µm and preferably 8 to 20 µm in view of formability after being laminated on the metal sheet 2, coatability to the metal sheet 2, impact resistance, and taste characteristics. This is because making a thin film with a film thickness of smaller than 3 µm increases the costs of film formation and makes it difficult to stably ensure performance and exceeding 25 µm causes a cost increase and degrades can formability on the contrary.

<Crystallinity>

In view of formability, the film 3 according to the present invention before being processed into a container has a ratio ($I_{011}/I_{100}$) of peak intensity ($I_{011}$) observed in the range of $2\theta=15.5$ degrees to 17.0 degrees to peak intensity ($I_{100}$) observed in the range of $2\theta=22.5$ degrees to 24.0 degrees in X-ray diffraction in the range of 0.2 to 5.0. Polybutylene terephthalate is high in crystallization rate, and crystals are formed without performing orientation treatment. When the crystals of polybutylene terephthalate are thus formed, they affect formability, and the amount of crystals is required to be controlled.

The peak observed in the range of $2\theta=22.5$ degrees to 24.0 degrees in X-ray diffraction is a diffraction peak corresponding to the (100) face of polybutylene terephthalate, whereas the peak observed in the range of $2\theta=15.5$ degrees to 17.0 degrees is a diffraction peak corresponding to the (011) face of polybutylene terephthalate. If the peak intensity ratio of these peaks ($I_{011}/I_{100}$) is lower than 0.2, the ratio of the (100) face is high, and formability is poor, which is unfavorable. In contrast, to make the peak intensity ratio ($I_{011}/I_{100}$) higher than 5.0, a lamination temperature is required to be raised as described below, and the film may melt and stick to a roll, which is unfavorable.

To appropriately control the peak intensity ratio ($I_{011}/I_{100}$), a heat history during lamination is required to be appropriately controlled. When heat input to the film is increased, the peak intensity ratio ($I_{011}/I_{100}$) increases. Increasing the heat input to the film is achieved by a method that raises the temperature of an entering sheet during lamination or a method that prolongs a lamination time, for example. The peak intensity ratio was determined using the following method. By an X-ray diffractometer RINT 2000 manufactured by Rigaku Corporation, using a Cu-α tube, measurement was performed in the range of $2\theta=10$ to 30 degrees, points of X-ray diffraction intensity at $2\theta=10$ degrees and $2\theta=30$ degrees are connected with a straight line, which is determined to be a baseline, and the height of the peak appearing in the range of $2\theta=22.5$ degrees to 24.0 degrees is measured based on the baseline. When the baseline is unclear, the temperature of the same laminated member is raised to the melting point or higher and is quenched with liquid nitrogen or the like to obtain a sample, which is measured by the above method, the result of which may be determined to be the baseline.

<Method for Manufacturing Film>

Known methods for manufacturing a polyester film can be used for a method for manufacturing the film 3 according to the present invention. As an example, resin pellets are heated and melted at a temperature higher than the melting temperature of the polyester resin using an extruder, the melted polyester resin is extruded out of a T die onto a cooled casting roll in a film manner, and is wound around a coiler as an unoriented resin film without being oriented. The film 3 according to the present invention may be provided with an adhesive layer by co-extrusion, lamination, or coating in order to further improve thermal adhesion performance and subsequent adhesion with the metal sheet 2. The dried film thickness of the adhesive layer is preferably 1 μm or smaller. The adhesive layer, which is not limited to a particular layer, is preferably a thermoset resin layer formed of an epoxy resin, a polyurethane resin, a polyester resin, or various modified resins thereof.

<Method for Manufacturing Laminated Metal Sheet>

The metal sheet 2 is preliminarily heated at 170 to 250° C. in advance and is pressed with the film 3 according to the present invention to be thermocompressively bonded thereto by a roll temperature-controlled to be lower than the metal sheet 2 by 30° C. or further 50° C. or more and is then cooled to room temperature. With this operation, the film 3 according to the present invention is continuously laminated on the metal sheet 2 to manufacture the laminated metal sheet 1.

Examples of a method for heating the metal sheet 2 include a heater roll heat transfer system, an induction heating system, a resistance heating system, and a hot-air transfer system. Examples of a method of cooling after lamination include a method of immersion into a coolant such as water and a method of contacting with a cooling roll.

As to the lamination condition of the film 3, an unoriented film can be made to adhere to the metal sheet 2 even at a temperature equal to or lower than the melting temperature of the polyester resin. The temperature during lamination can be adjusted to the extent that the performance of the laminated metal sheet 1 according to the present invention is not impaired. The temperature of the metal sheet 2 immediately before lamination is set to 160 to 240° C., preferably 170 to 230° C., and further preferably 180 to 220° C., for example. If the temperature of the metal sheet 2 is less than 160° C., the polyester resin does not sufficiently flow and does not cover the surface of the metal sheet 2 when being pressurized by a roll, and adhesion is poor. If the temperature of the metal sheet 2 exceeds 240° C., the temperature exceeds the melting point of the polyester resin layer as the upper layer 3b, and the remelted film 3 crystallizes after lamination, which impairs formability.

As to a temperature history that the film 3 receives during lamination, a time during which the film 3 is in contact with the metal sheet 2 at the temperature is preferably in the range of 1 to 35 msec. To achieve this lamination condition, cooling during lamination is required in addition to high-speed lamination. Pressurization during lamination is not limited to a particular manner; 9.8 to 294 N/cm$^2$ (1 to 30 kgf/cm$^2$) as surface pressure is preferred. If this value is excessively small, even when a temperature that a resin interface reaches is within the above-described temperature range, the time is short and melting is insufficient, whereby sufficient adhesion is difficult to be obtained. If the pressurization is large, although there is no inconvenience in the performance of the laminated metal sheet 1, force acting on a lamination roll is large, which requires strength in terms of equipment and causes an increase in the size of an apparatus, resulting in poor economy.

As described above, the laminated metal sheet 1 of the present embodiment can provide a laminated metal sheet for a container that is excellent in both formability and the design of can body appearance after the retort sterilization treatment and can be used for two-piece cans such as DRD cans and DI cans.

The embodiment is only an example for performing the present invention; the present invention is not limited thereto; it is obvious from the above description that various modifications in accordance with specifications and the like are within the scope of the present invention and that various other embodiments are feasible within the scope of the present invention.

EXAMPLES

A steel sheet (temper: T3CA) subjected to cold rolling, annealing, and temper rolling with a thickness of 0.22 mm was degreased, pickled, and subjected to chromium plating to manufacture a chromium-plated steel sheet (TFS). Chromium plating was performed by performing chromium plating in a chromium plating bath containing $CrO_3$, $F^-$, and $SO_4^{2-}$, performing intermediate rinsing, and performing electrolysis with a chemical conversion treatment liquid containing $CrO_3$ and $F^-$. In this process, electrolysis conditions (a current density, the quantity of electricity, and the like) were adjusted, and the deposition amount of metallic chromium and the deposition amount of chromium hydroxide were adjusted to 120 mg/m$^2$ and 15 mg/m$^2$, respectively, in terms of Cr.

Subsequently, using a metal sheet coating apparatus, the chromium-plated steel sheet obtained as described above was heated, and both faces of the chromium-plated steel sheet were coated with a laminated polyester resin according to the present invention by lamination rolls so as to adjust the lamination temperature to 185° C. The lamination rolls were of an internal water-cooled type, in which cooling water was forcedly circulated during coating to perform cooling during film adhesion. The following describes the characteristics of the used film and method, measurement, and evaluation methods for the characteristics of a coated metal sheet manufactured by the method.

(1) Adhesion after Forming

In DI forming, first, paraffin wax with a melting point of 45° C. was applied to both faces of a laminated steel sheet with 50 mg/m$^2$, a blank with a diameter of 123 mm was then punched out, and the blank was drawn-formed into a cup with an inner diameter of 71 mm and a height of 36 mm by a commercially available cupping press. Subsequently, this cup was put into a commercially available DI forming apparatus, was subjected to redrawing with a punching speed of 200 mm/s and a stroked of 560 mm, was subjected to three-step ironing to achieve a total reduction rate of 50% (respective reduction rates of 20%, 19%, and 23%), and was finally formed into a can with a can inner diameter of 52 mm and a can height of 90 mm. During the DI forming, tap water was circulated therethrough at a temperature of 50° C. The scratch condition of the surface after can formation was evaluated (refer to (4) below). Retort sterilization treatment was performed at 125° C. for 60 minutes on the inner and outer faces of the can after the DI forming. This can was taken out of a retort sterilization treatment apparatus, and occurrence of film peeling from a can opening edge, and when peeling occurred, peeling length (how many millimeters the film peeled off from the can opening edge) were evaluated by the following grades as adhesion after formation.

(Grades)
A: No occurrence
B: shorter than 5 (mm)
C: shorter than 20 (mm) and 5 (mm) or longer
D: 20 (mm) or longer (2) Resistance to Retort Whitening Resistance to retort whitening was evaluated for the bottom (the can outer face side) of a formable can. Specifically, the can was filled with normal temperature tap water and was hermetically sealed by seaming a lid. Subsequently, with the can bottom directed downward, the can was arranged in a vapor retort sterilization treatment furnace, and retort sterilization treatment was performed at 125° C. for 90 minutes. After the end of the retort sterilization treatment, rapid cooling was performed, and an appearance change on the can outer face side of the bottom was visually observed to evaluate resistance to retort whitening by the following grades.

(Grades)
A: No appearance change was observed.
B: Faint cloudiness in appearance (less than 5% in terms of film surface area) occurred.
C: Faint cloudiness in appearance (5% or more and less than 10% in terms of film surface area) occurred.
D: Appearance became turbid in white (whitening of 10% or more in terms of film surface area occurred).

(3) Resistance to Discoloration

In a film to which coloring pigments (white or yellow) are added, the color tone thereof may change after the retort sterilization treatment, and as an evaluation of resistance to discoloration, a color tone change before and after the retort sterilization treatment was evaluated. A surface color tone before and after the retort sterilization treatment was examined using a spectroscopic colorimeter SQ-2000 manufactured by Nippon Denshoku Industries Co. Ltd. With $L_1^*$, $a_1^*$, and $b_1^*$ as values before the retort sterilization treatment, and with $L_2^*$, $a_2^*$, and $b_2^*$ as values after the retort sterilization treatment, $\Delta E^*$ was determined by the following Equation (1). Resistance to discoloration was evaluated by the following grades based on $\Delta E^*$.

$$\Delta E^* = \{(L_1^* - L_2^*)^2 + (a_1^* - a_2^*)^2 + (b_1^* - b_2^*)^2\}^{0.5} \qquad (1)$$

(Grades)
A: $\Delta E^* \leq 5.0$
B: $5.0 < \Delta E^* \leq 10$
D: $\Delta E^* > 10$ (4) Can Formability In the evaluation of adhesion after formation in (1), the area rate of scratches that occurred on the outer face side when the DI forming was performed was visually inspected to evaluate can formability by the following grades.

(Grades)
A: 0%
B: less than 5%
C: less than 20% and 5% or more
D: 20% or more

Table 1 lists evaluation results of examples and comparative examples using a two-layer structure film. The two-layer structure film means a film including lower layer polyester as the lower layer 3a in contact with the metal sheet of the laminated resin layer and main layer polyester as the upper layer 3b thereon. The examples within the scope claimed in the present application were excellent in all of film adhesion after can formation, resistance to retort whitening, resistance to discoloration, and can formability. In contrast, Comparative Examples 1 to 4 were outside the invention of the present application in the composition of the main layer polyester and were poor in resistance to retort whitening. Comparative Examples 5 and 6 were outside the invention of the present application in the acid component of the lower layer and were poor in resistance to retort whitening. Comparative Example 7 was outside the invention of the present application in the glycol component of the lower layer and was poor in resistance to retort whitening and can formability. Comparative Example 8 included one layer, was outside the invention of the present application in the configuration of the layer in intimate contact with the steel sheet, and was poor in adhesion. Comparative Example 9 had a total thickness of the film of 40 μm and was poor in can formability. Comparative Example 10 used a film subjected to biaxially orientation treatment, was outside the invention of the present application in the crystalline state, and was poor in can formability. Comparative Example 11 was outside the invention of the present application in the crystalline state, was faulty in manufacture, and could not be manufactured.

Table 2 lists evaluation results of examples and comparative examples using a three-layer structure film. The three-layer structure film means a film including lower layer polyester similar to that of the two-layer structure film, main layer polyester to which a coloring pigment is added, and outer layer polyester provided in the outermost layer 3c on the outer face side of this main layer polyester. The examples within the scope claimed in the present application were excellent in all of film adhesion after can formation, resistance to retort whitening, resistance to discoloration, and can formability. In contrast, Comparative Example 12 was outside the invention of the present application in the acid component of the main layer, and Comparative Example 13 was outside the invention of the present application in the glycol component of the main layer, which were poor in resistance to retort whitening. Comparative Example 14 was outside the invention of the present application in the glycol component of the lower layer and was poor in resistance to retort whitening and can formability. Comparative Example 15 included two layers, was outside the invention of the present application in the glycol component of the layer in intimate contact with the steel sheet, and was poor in adhesion. Comparative Example 16 was outside the invention of the present application in the crystalline state and was poor in can formability.

TABLE 1

| | Resin composition | | | | | | | |
|---|---|---|---|---|---|---|---|---|
| | Main layer polyester (3b) | | | | | Lower layer polyester (3a) | | |
| | Acid component (mol %) | Glycol component (mol %) | Coloring pigment (color) | Content of coloring pigment (mass %) | Film thickness (μm) | Acid component (mol %) | Glycol component (mol %) | Film thickness (μm) | Orientation treatment |
| Inventive Example 1 | TPA(100) | EG(3), BG(97) | — (Clear) | — | 13.5 | TPA(100) | EG(40), BG(60) | 1.5 | Unoriented |
| Inventive Example 2 | TPA(95), IPA(5) | EG(5), BG(95) | — (Clear) | — | 18.0 | TPA(100) | EG(40), BG(60) | 2.0 | Unoriented |
| Inventive Example 3 | TPA(90), IPA(10) | EG(5), BG(95) | — (Clear) | — | 13.5 | TPA(100) | EG(40), BG(60) | 1.5 | Unoriented |
| Inventive Example 4 | TPA(95), IPA(5) | EG(10), BG(90) | — (Clear) | — | 18.0 | TPA(100) | EG(40), BG(60) | 2.0 | Unoriented |
| Inventive Example 5 | TPA(100) | EG(5), BG(95) | — (Clear) | — | 12.0 | TPA(100) | EG(40), BG(60) | 3.0 | Unoriented |
| Inventive Example 6 | TPA(100) | EG(5), BG(95) | — | — | 12.0 | TPA(90), IPA(10) | EG(40), BG(60) | 3.0 | Unoriented |
| Inventive Example 7 | TPA(100) | EG(3), BG(97) | — (Clear) | — | 12.6 | TPA(100) | EG(40), BG(60) | 5.4 | Unoriented |
| Inventive Example 8 | TPA(100) | EG(3), BG(97) | — (Clear) | — | 7.5 | TPA(100) | EG(40), BG(60) | 7.5 | Unoriented |
| Inventive Example 9 | TPA(100) | EG(3), BG(97) | — (Clear) | — | 8.0 | TPA(100) | EG(40), BG(60) | 2.0 | Unoriented |
| Inventive Example 10 | TPA(100) | EG(3), BG(97) | — (Clear) | — | 12.0 | TPA(100) | EG(40), BG(60) | 3.0 | Unoriented |
| Inventive Example 11 | TPA(100) | EG(3), BG(97) | — (Clear) | — | 16.0 | TPA(100) | EG(40), BG(60) | 4.0 | Unoriented |
| Inventive Example 12 | TPA(100) | EG(5), BG(95) | — (Clear) | — | 23.8 | TPA(100) | EG(40), BG(60) | 1.3 | Unoriented |
| Inventive Example 13 | TPA(100) | EG(10), BG(90) | — (Clear) | — | 13.5 | TPA(100) | EG(40), BG(60) | 1.5 | Unoriented |
| Inventive Example 14 | TPA(100) | EG(10), BG(90) | — (Clear) | — | 12.0 | TPA(100) | EG(40), BG(60) | 3.0 | Unoriented |
| Inventive Example 15 | TPA(100) | EG(10), BG(90) | — (Clear) | — | 12.6 | TPA(100) | EG(50), BG(50) | 5.4 | Unoriented |
| Inventive Example 16 | TPA(100) | EG(10), BG(90) | — (Clear) | — | 7.5 | TPA(95), IPA(5) | EG(50), BG(50) | 7.5 | Unoriented |
| Inventive Example 17 | TPA(100) | EG(5), BG(95) | — (Clear) | — | 18.0 | TPA(95), IPA(5) | EG(50), BG(50) | 2.0 | Unoriented |
| Inventive Example 18 | TPA(100) | EG(5), BG(95) | — (Clear) | — | 12.0 | TPA(100) | EG(30), BG(70) | 3.0 | Unoriented |
| Inventive Example 19 | TPA(100) | EG(3), BG(97) | — (Clear) | — | 16.0 | TPA(100) | EG(50), BG(50) | 4.0 | Unoriented |
| Inventive Example 20 | TPA(100) | EG(3), BG(97) | — (Clear) | — | 10.5 | TPA(100) | EG(50), BG(50) | 4.5 | Unoriented |
| Inventive Example 21 | TPA(100) | EG(3), BG(97) | — (Clear) | — | 10.0 | TPA(100) | EG(50), BG(50) | 10.0 | Unoriented |
| Inventive Example 22 | TPA(100) | EG(3), BG(97) | — (Clear) | — | 14.4 | TPA(100) | EG(40), BG(60) | 3.6 | Unoriented |
| Inventive Example 23 | TPA(100) | EG(3), BG(97) | — (Clear) | — | 18.0 | TPA(100) | EG(40), BG(60) | 2.0 | Unoriented |
| Inventive Example 24 | TPA(90), IPA(10) | EG(5), BG(95) | — (Clear) | — | 10.0 | TPA(95), IPA(5) | EG(50), BG(50) | 10.0 | Unoriented |
| Inventive Example 25 | TPA(90), IPA(10) | EG(5), BG(95) | Titanium dioxide (white) | 5 | 10.0 | TPA(95), IPA(5) | EG(50), BG(50) | 10.0 | Unoriented |
| Inventive Example 26 | TPA(90), IPA(10) | EG(5), BG(95) | Titanium dioxide (white) | 30 | 10.0 | TPA(95), IPA(5) | EG(50), BG(50) | 10.0 | Unoriented |

TABLE 1-continued

| | | | | | | | | | |
|---|---|---|---|---|---|---|---|---|---|
| Comparative Example 1 | TPA(800), IPA(20) | EG(5), BG(95) | — | (Clear) | — | 13.5 | TPA(100) | EG(40), BG(60) | 1.5 | Unoriented |
| Comparative Example 2 | TPA(50), IPA(50) | BG(100) | — | (Clear) | — | 13.5 | TPA(100) | EG(40), BG(60) | 1.5 | Unoriented |
| Comparative Example 3 | TPA(100) | EG(20), BG(80) | — | (Clear) | — | 12.0 | IPA(100) | EG(40), BG(60) | 3.0 | Unoriented |
| Comparative Example 4 | TPA(100) | EG(100) | — | (Clear) | — | 12.0 | IPA(100) | EG(40), BG(60) | 3.0 | Unoriented |
| Comparative Example 5 | TPA(100) | BG(100) | — | (Clear) | — | 10.5 | TPA(80), IPA(20) | EG(40), BG(60) | 4.5 | Unoriented |
| Comparative Example 6 | TPA(100) | EG(5), BG(95) | — | (Clear) | — | 10.5 | TPA(50), IPA(50) | EG(40), BG(60) | 4.5 | Unoriented |
| Comparative Example 7 | TPA(100) | BG(100) | — | (Clear) | — | 12.0 | TPA(100) | EG(100) | 3.0 | Unoriented |
| Comparative Example 8 | TPA(100) | EG(5), BG(95) | — | (Clear) | — | 15.0 | — | — | 0.0 | Unoriented |
| Comparative Example 9 | TPA(100) | EG(5), BG(95) | — | (Clear) | — | 36.0 | TPA(100) | EG(40), BG(60) | 4.0 | Unoriented |
| Comparative Example 10 | TPA(100) | BG(100) | — | (Clear) | — | 10.5 | TPA(100) | EG(40), BG(60) | 4.5 | Biaxially oriented |
| Comparative Example 11 | TPA(100) | EG(5), BG(95) | — | (Clear) | — | 18.0 | TPA(95), IPA(5) | EG(50), BG(50) | 2.0 | Unoriented |

| | Film thickness ratio of lever layer (%) | Film thickness of main layer + lower layer (μm) | X-ray diffraction $I_{011}/I_{100}$ | Film adhesion after can formation | Resistance to retort whitening | Resistance to discoloration | Can formability |
|---|---|---|---|---|---|---|---|
| Inventive Example 1 | 10 | 15 | 0.3 | A | A | A | A |
| Inventive Example 2 | 10 | 20 | 0.6 | A | A | A | A |
| Inventive Example 3 | 10 | 15 | 1.2 | A | B | A | A |
| Inventive Example 4 | 10 | 20 | 1.0 | A | B | A | A |
| Inventive Example 5 | 20 | 15 | 0.5 | A | A | A | A |
| Inventive Example 6 | 20 | 15 | 0.9 | A | B | A | A |
| Inventive Example 7 | 30 | 18 | 1.6 | A | A | A | A |
| Inventive Example 8 | 50 | 15 | 1.2 | B | A | A | A |
| Inventive Example 9 | 20 | 10 | 2.0 | A | A | A | B |
| Inventive Example 10 | 20 | 15 | 3.5 | A | A | A | B |
| Inventive Example 11 | 20 | 20 | 2.1 | A | A | A | A |
| Inventive Example 12 | 5 | 25 | 0.8 | B | A | A | A |
| Inventive Example 13 | 10 | 15 | 0.4 | A | A | A | A |
| Inventive Example 14 | 20 | 15 | 2.3 | A | A | A | A |
| Inventive Example 15 | 30 | 18 | 1.2 | A | A | A | A |
| Inventive Example 16 | 50 | 15 | 0.7 | B | A | A | A |
| Inventive Example 17 | 10 | 20 | 1.3 | A | A | A | A |
| Inventive Example 18 | 20 | 15 | 1.1 | A | A | A | A |
| Inventive Example 19 | 20 | 20 | 1.0 | A | A | A | A |
| Inventive Example 20 | 30 | 15 | 3.6 | A | A | A | B |
| Inventive Example 21 | 50 | 20 | 1.6 | B | A | A | A |
| Inventive Example 22 | 20 | 18 | 2.0 | A | A | A | A |
| Inventive Example 23 | 10 | 20 | 0.8 | A | A | A | A |

TABLE 1-continued

| | | | | | | | | |
|---|---|---|---|---|---|---|---|---|
| Inventive Example 24 | | 50 | 20 | 1.0 | B | A | A | A |
| Inventive Example 25 | | 50 | 20 | 0.9 | B | A | A | A |
| Inventive Example 26 | | 50 | 20 | 2.6 | B | A | B | A |
| Comparative Example 1 | | 10 | 15 | 2.0 | B | C | A | B |
| Comparative Example 2 | | 10 | 15 | 0.8 | B | C | A | B |
| Comparative Example 3 | | 20 | 15 | 1.0 | A | C | A | B |
| Comparative Example 4 | | 20 | 15 | 0.9 | A | C | A | B |
| Comparative Example 5 | | 30 | 15 | 2.0 | B | C | A | B |
| Comparative Example 6 | | 30 | 15 | 2.0 | B | C | A | B |
| Comparative Example 7 | | 20 | 15 | 2.0 | A | D | A | C |
| Comparative Example 8 | | 0 | 15 | 0.8 | D | A | A | A |
| Comparative Example 9 | | 10 | 40 | 1.0 | B | A | A | D |
| Comparative Example 10 | | 30 | 15 | 0.1 | — | A | A | D |
| Comparative Example 11 | | 10 | 20 | 8.0 | — | — | — | D |

TABLE 2

| | Resin composition | | | | | | | | | |
|---|---|---|---|---|---|---|---|---|---|---|
| | Outermost layer polyester (3c) | | | Main layer (upper layer) polyester (3b) | | | | | Lower layer polyester (3a) | |
| | Acid component (mol %) | Glycol component (mol %) | Film thickness (μm) | Acid component (mol %) | Glycol component (mol %) | Coloring pigment (color) | Content at coloring pigment (mass %) | Film thickness (μm) | Acid component (mol %) | Glycol component (mol %) |
| Inventive Example 27 | TPA(100) | EG(40), BG(60) | 1.0 | TPA(100) | EG(3), BG(97) | Disazo yellow (yellow) | 0.5 | 17.1 | TPA(100) | EG(40), BG(60) |
| Inventive Example 28 | TPA(100) | EG(40), BG(60) | 1.0 | TPA(100) | EG(3), BG(97) | Disazo yellow (yellow) | 0.5 | 11.1 | TPA(100) | EG(40), BG(60) |
| Inventive Example 29 | TPA(100) | EG(40), BG(60) | 1.0 | TPA(100) | EG(3), BG(97) | Disazo yellow (yellow) | 0.5 | 15.1 | TPA(100) | EG(40), BG(60) |
| Inventive Example 30 | TPA(100) | EG(40), BG(60) | 1.0 | TPA(100) | EG(3), BG(97) | Disazo yellow (yellow) | 0.5 | 7.0 | TPA(100) | EG(40), BG(60) |
| Inventive Example 31 | TPA(100) | EG(40), BG(60) | 1.0 | TPA(100) | EG(3), BG(97) | Disazo yellow (yellow) | 0.5 | 7.2 | TPA(100) | EG(40), BG(60) |
| Inventive Example 32 | TPA(100) | EG(100) | 1.0 | TPA(100) | EG(3), BG(97) | Disazo yellow (yellow) | 0.5 | 11.1 | TPA(100) | EG(40), BG(60) |
| Inventive Example 33 | TPA(100) | EG(40), BG(60) | 1.0 | TPA(100) | EG(3), BG(97) | Disazo yellow (yellow) | 0.5 | 13.4 | TPA(100) | EG(40), BG(60) |
| Inventive Example 34 | TPA(100) | EG(40), BG(60) | 1.0 | TPA(100) | BG(100) | Disazo yellow (yellow) | 0.5 | 22.8 | TPA(100) | EG(40), BG(60) |
| Inventive Example 35 | TPA(100) | EG(40), BG(60) | 1.0 | TPA(100) | EG(3), BG(97) | Disazo yellow (yellow) | 0.5 | 17.1 | TPA(100) | EG(40), BG(60) |
| Inventive Example 36 | TPA(100) | EG(40), BG(60) | 1.0 | TPA(100) | EG(3), BG(97) | Disazo yellow (yellow) | 0.5 | 11.2 | TPA(100) | EG(40), BG(60) |
| Inventive Example 37 | TPA(100) | EG(40), BG(60) | 1.0 | TPA(100) | EG(3), BG(97) | Disazo yellow (yellow) | 0.5 | 9.6 | TPA(100) | EG(40), BG(60) |

TABLE 2-continued

| | | | | | | | | | | |
|---|---|---|---|---|---|---|---|---|---|---|
| Inventive Example 38 | TPA(100) | EG(40), BG(60) | 1.0 | TPA(100) | EG(10), BG(90) | Disazo yellow (yellow) | 0.5 | 7.0 | TPA(100) | EG(40), BG(60) |
| Inventive Example 39 | TPA(95), IPA(5) | EG(5), BG(95) | 1.0 | TPA(100) | EG(3), BG(97) | Disazo yellow (yellow) | 0.5 | 17.1 | TPA(95), IPA(5) | EG(5), BG(95) |
| Inventive Example 40 | TPA(95), IPA(5) | EG(5), BG(95) | 1.0 | TPA(100) | EG(3), BG(97) | Disazo yellow (yellow) | 0.5 | 13.6 | TPA(95), IPA(5) | EG(5), BG(95) |
| Inventive Example 41 | TPA(100) | EG(40), BG(60) | 1.0 | TPA(100) | EG(3), BG(97) | Disazo yellow (yellow) | 0.5 | 13.3 | TPA(100) | EG(40), BG(60) |
| Inventive Example 42 | TPA(100) | EG(40), BG(60) | 1.0 | TPA(100) | BG(100) | Disazo yellow (yellow) | 0.5 | 7.0 | TPA(100) | EG(40), BG(60) |
| Inventive Example 43 | TPA(100) | EG(40), BG(60) | 1.0 | TPA(100) | BG(100) | Titanium dioxide (white) | 10 | 7.0 | TPA(100) | EG(40), BG(60) |
| Inventive Example 44 | — | — | 1.0 | TPA(100) | BG(100) | Disazo yellow (yellow) | 0.5 | 7.0 | TPA(100) | EG(40), BG(60) |
| Comparative Example 12 | IPA(100) | EG(40), BG(60) | 1.0 | TPA(50), IPA(50) | BG(100) | Disazo yellow (yellow) | 0.5 | 12.6 | TPA(100) | EG(40), BG(60) |
| Comparative Example 13 | IPA(100) | EG(40), BG(60) | 1.0 | TPA(100) | EG(100) | Disazo yellow (yellow) | 0.5 | 11.2 | TPA(100) | EG(40), BG(60) |
| Comparative Example 14 | IPA(100) | EG(100) | 1.0 | TPA(100) | BG(100) | Disazo yellow (yellow) | 0.5 | 11.2 | TPA(100) | EG(100) |
| Comparative Example 15 | IPA(100) | EG(40), BG(60) | 1.0 | TPA(100) | BG(100) | Disazo yellow (yellow) | 0.5 | 14.0 | — | — |
| Comparative Example 16 | TPA(100) | EG(40), BG(60) | 1.0 | TPA(100) | EG(3), BG(97) | Disazo yellow (yellow) | 0.5 | 13.9 | TPA(100) | EG(40), BG(60) |

| | Lower layer polyester (3a) Film thickness (mol %) | Orientation treatment | Film thickness ratio of lower layer (%) | Film thickness of 3b + 3a (μm) | Film thickness of 3a + 3b + 3c (μm) | X-ray diffraction $I_{011}/I_{100}$ | Film adhesion after can formation | Resistance to retort whitening | Resistance to discoloration | Can formability |
|---|---|---|---|---|---|---|---|---|---|---|
| Inventive Example 27 | 1.9 | Unoriented | 10 | 19 | 20 | 2.1 | A | A | A | A |
| Inventive Example 28 | 2.8 | Unoriented | 20 | 14 | 15 | 0.4 | A | A | A | A |
| Inventive Example 29 | 1.9 | Unoriented | 11 | 17 | 18 | 0.6 | A | A | A | A |
| Inventive Example 30 | 7.0 | Unoriented | 50 | 14 | 15 | 1.1 | B | A | A | A |
| Inventive Example 31 | 1.8 | Unoriented | 20 | 9 | 10 | 3.1 | A | A | A | A |
| Inventive Example 32 | 2.8 | Unoriented | 20 | 14 | 15 | 1.6 | A | A | A | B |
| Inventive Example 33 | 3.6 | Unoriented | 21 | 17 | 18 | 1.1 | A | A | A | A |
| Inventive Example 34 | 1.2 | Unoriented | 5 | 24 | 25 | 0.8 | B | A | A | A |
| Inventive Example 35 | 1.9 | Unoriented | 10 | 19 | 20 | 0.8 | A | A | A | A |
| Inventive Example 36 | 2.8 | Unoriented | 20 | 14 | 15 | 0.7 | A | A | A | A |
| Inventive Example 37 | 4.2 | Unoriented | 30 | 14 | 15 | 3.6 | A | A | A | A |
| Inventive Example 38 | 7.0 | Unoriented | 50 | 14 | 15 | 2.2 | A | A | A | B |
| Inventive Example 39 | 1.9 | Unoriented | 10 | 19 | 20 | 2.6 | A | A | A | A |
| Inventive Example 40 | 3.4 | Unoriented | 20 | 17 | 18 | 1.4 | A | A | A | A |
| Inventive Example 41 | 5.7 | Unoriented | 30 | 19 | 20 | 1.3 | A | A | A | A |
| Inventive Example 42 | 7.0 | Unoriented | 50 | 14 | 15 | 0.4 | B | A | A | A |
| Inventive Example 43 | 7.0 | Unoriented | 50 | 14 | 15 | 3.1 | B | A | A | A |

TABLE 2-continued

| | | | | | | | | | | |
|---|---|---|---|---|---|---|---|---|---|---|
| Inventive Example 44 | 7.0 | Unoriented | 50 | 14 | 15 | 0.9 | D | A | B | A |
| Comparative Example 12 | 1.4 | Unoriented | 10 | 14 | 15 | 0.7 | B | C | A | B |
| Comparative Example 13 | 2.8 | Unoriented | 20 | 14 | 15 | 1.6 | A | C | A | B |
| Comparative Example 14 | 2.8 | Unoriented | 20 | 14 | 15 | 1.5 | A | D | A | D |
| Comparative Example 15 | 0.0 | Unoriented | 0 | 14 | 15 | 1.6 | D | A | A | A |
| Comparative Example 16 | 3.1 | Unoriented | 18 | 17 | 18 | 0.1 | A | A | A | D |

INDUSTRIAL APPLICABILITY

The present invention can provide a laminated metal sheet for a container that is excellent in both formability and the design of can body appearance after the retort sterilization treatment and can be used for two-piece cans such as DRD cans and DI cans.

REFERENCE SIGNS LIST

1 Laminated metal sheet
2 Metal sheet
3 Film
3a Lower layer of laminated resin layer
3b Upper layer (main layer) of laminated resin layer
3c Further upper layer (outermost layer) of laminated resin layer 3b

The invention claimed is:

1. A laminated metal sheet for a container, the laminated metal sheet comprising a laminated resin layer comprising at least two layers with polyester formed by polymerizing a polycarboxylic acid component and a polyol component as a main component on one face or both faces of a metal sheet,
wherein a polyester resin layer serving as a lower layer in contact with the metal sheet of the laminated resin layer contains 90 mol % or more of terephthalic acid in the polycarboxylic acid component and 30 to 50 mol % of ethylene glycol, 50 to 70 mol % of 1,4-butanediol, and 10 mol % or less of other polyol components in the polyol component, and
a polyester resin layer serving as a main layer and an upper layer of the laminated resin layer comprises polyester containing 90 mol % or more of terephthalic acid in the polycarboxylic acid component and 90 mol % or more of 1,4-butanediol in the polyol component,
the laminated resin layer has a total thickness of 3 to 25 µm, and has a ratio ($I_{011}/I_{100}$) of peak intensity ($I_{011}$) observed in a range of $2\theta=15.5$ degrees to 17.0 degrees to peak intensity ($I_{100}$) observed in a range of $2\theta=22.5$ degrees to 24.0 degrees in X-ray diffraction in a range of 0.2 to 5.0,
a temperature of the metal sheet immediately before lamination is in the range of 160 to 240° C., and a time in which the laminated resin layer is in contact with the metal sheet during lamination is in a range of 1 to 35 ms.

2. The laminated metal sheet for a container according to claim 1, wherein the lower layer in contact with the metal sheet in the laminated resin layer has a film thickness ratio of 10 to 30% relative to a total thickness of the laminated resin layer.

3. The laminated metal sheet for a container according to claim 1, wherein the laminated resin layer contains a coloring pigment.

4. The laminated metal sheet for a container according to claim 1, comprising a polyester resin of 1 µm or thicker laminated further above the laminated resin layer, wherein the entire resin layer has a total film thickness of 3 to 25 µm.

5. The laminated metal sheet for a container according to claim 2, wherein the laminated resin layer contains a coloring pigment.

6. The laminated metal sheet for a container according to claim 2, comprising a polyester resin of 1 µm or thicker laminated further above the laminated resin layer, wherein the entire resin layer has a total film thickness of 3 to 25 µm.

7. The laminated metal sheet for a container according to claim 3, comprising a polyester resin of 1 µm or thicker laminated further above the laminated resin layer, wherein the entire resin layer has a total film thickness of 3 to 25 µm.

8. The laminated metal sheet for a container according to claim 5, comprising a polyester resin of 1 µm or thicker laminated further above the laminated resin layer, wherein the entire resin layer has a total film thickness of 3 to 25 µm.

* * * * *